June 28, 1966 R. T. FARRELL 3,258,087
VEHICLE SPOTTING MEANS
Filed Oct. 7, 1964

INVENTOR.
RICHARD T. FARRELL
BY John R. Walker, III
Attorney

United States Patent Office 3,258,087
Patented June 28, 1966

3,258,087
VEHICLE SPOTTING MEANS
Richard T. Farrell, Memphis, Tenn., assignor to
Dover Corporation, Washington, D.C.
Filed Oct. 7, 1964, Ser. No. 402,242
5 Claims. (Cl. 187—8.77)

This invention relates to means for aiding in the spotting or positioning of a vehicle relative to a vehicle lift.

In positioning a vehicle over a vehicle lift in preparation for the lifting thereof, it is important that the vehicle be properly positioned longitudinally relative to the vehicle lift in order to insure balanced loading. Thus, it is desirable to have the center of gravity of the vehicle over lift jack since, if the vehicle and its center of gravity were too far forward relative to the vehicle jack, the weight of the front of the vehicle would cause a tendency of the vehicle to tilt forwardly and downwardly and, if too far rearwardly, would cause a tendency of the vehicle to tilt rearwardly and downwardly. These tilting forces would cause undue strain on the vehicle lift, as, for example, on the jack and on the superstructure. Thus, if the superstructure were of the swinging arm type and the vehicle were too far forward (or rearward), the forward (or rearward) arms of the superstructure would be under a much greater load and strain than the rearward (or forward) arms, and, of course, if the vehicle were sufficiently far forward (or rearward), it would fall off the superstructure. Heretofore, a so-called wheel spotting dish has been used in conjunction with vehicle lift installations and has been located on the floor of the service station or the supporting surface where the vehicle lift was installed. The spotting dish has two dished out portions, one in front of the other, and the spotting dish was located in such a position forwardly of the vehicle lift that vehicles having a wheel base greater than a predetermined amount, as, for example, 120 inches, should be placed with a front wheel in the forward one of the two dished out portions for a substantially proper position of the vehicle relative to the vehicle lift, and for vehicles having a wheel base equal to or less than said predetermined amount, a front wheel of the vehicle should be placed in the rearward one of the two dished out portions for the vehicle to be substantially properly placed relative to the vehicle lift. In other words, the vehicles were divided into two different categories, namely, a first category having a wheel base of 120 inches or less, and a second category of those having a wheel base greater than 120 inches. Thus, the correct spotting of vehicles was determined by the wheel base of the vehicle and into which of the two above-mentioned categories the vehicle fell. Heretofore, this has been guesswork on the part of the operator to determine into which of these two categories the vehicles fell, which could result in dangerous consequences if the operator guessed wrong.

The present invention is directed towards providing means for taking the guesswork out of the determination of the category into which the wheel base of vehicles fall.

Thus, one of the objects of the present invention is to provide means for adding in the spotting or positioning of a vehicle relative to a vehicle lift.

A further object is to provide such means which indicates to the operator the category into which the wheel base length of the vehicle falls.

A further object is to provide such a means which insures safety in the spotting of a vehicle relative to a vehicle lift.

A further object is to provide a simple yet highly effective means which eliminates guesswork on the part of the operator as to the wheel base length of a vehicle.

A further object is to provide such means which permits greater speed and yet greater accuracy in the spotting of vehicles.

A further object is to provide a positive indication of the category into which the wheel base lengths of vehicles fall.

A further object is to provide an inexpensive and time-saving device for aiding in the spotting of a vehicle relative to a vehicle lift.

A further object is generally to improve the design and construction of means for aiding in the spotting of a vehicle relative to a vehicle lift.

The means by which the foregoing and other objects of the present invention are accomplished and the manner of their accomplishment will be readily understood from the following specification upon reference to the accompanying drawings, in which.

Figure 1:
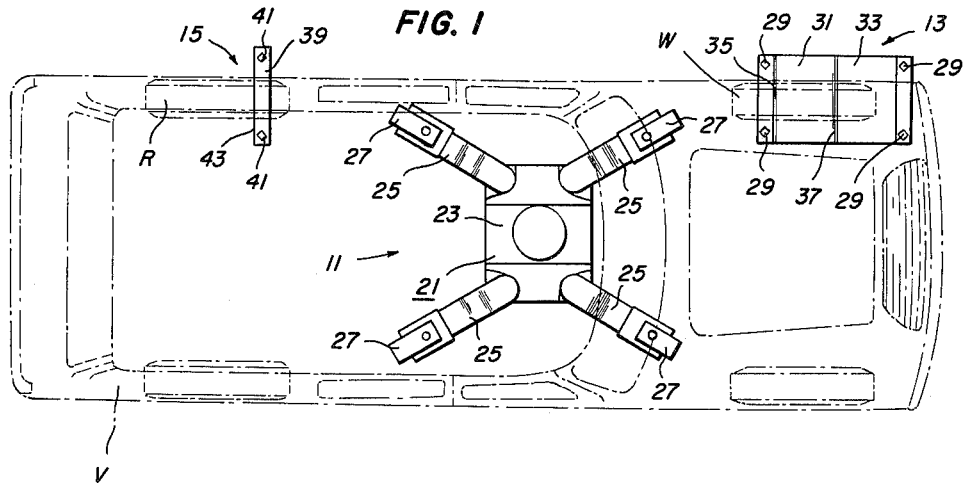
FIG. 1 is a plan view of the means of the present invention incorporated in a vehicle lift installation and showing the relationship of a vehicle thereto, with the vehicle being shown in broken lines.
Figure 2:
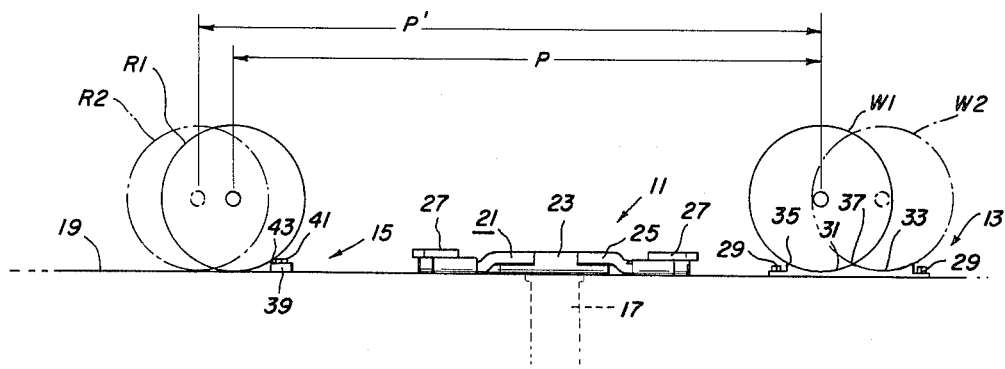
FIG. 2 is a side elevational view of the means of the present invention with the vehicle lift installation shown in conjunction therewith, and with diagrammatic representations of various positions of vehicle wheels relative thereto.

Referring now to the drawings in which the various parts are indicated by numerals, a typical vehicle lift 11 and front wheel dish 13, in conjunction with which the device 15 of the present invention is used, are shown in FIGS. 1 and 2. Vehicle lift 11 includes the usual vertically disposed jack 17 which extends upwardly through a vehicle supporting surface 19, such as the floor of a service station. In addition, vehicle lift 11 comprises the usual superstructure 21 mounted on top of jack 17 and which includes the usual head plate 23 fixedly attached to the upper end of the vertically movable piston, not shown, of the jack 17 to carry the superstructure from a lowered position, as shown in FIG. 2, upwardly to raise the vehicle, as vehicle V, in the usual manner. Also, superstructure 21 includes the arms 25 swingably attached to head plate 23 for movement about vertical axes and which have pads 27 respectively mounted on the outer ends thereof to contact the frame of the vehicle V for the lifting thereof in the usual manner.

For purposes of clarity, the forward direction or forward side of the parts shown in the drawing will be to the right, as viewed in FIGS. 1 and 2, and the rearward direction or side will be that to the left, since a vehicle V, approaching the vhicle lift 11 to be spotted in position, will normally be driven forwardly and will approach from the left, as viewed in FIGS. 1 and 2, from where it will be driven over vehicle lift 11 with the vehicle lift being in a lowered position and being centered relative to the vehicle.

Front wheel dish 13 is preferably formed of a piece of rigid material, such as steel, and is fixedly attached to supporting surface 19 as by fastening means 29 or the like. Front wheel dish 13 comprises an upwardly facing dished out rearward portion 31 and a similar dished out forward portion 33 provided just forwardly of the rearward portion 31. The dished out portions 31, 33 are arranged transversely relative to vehicle V and the vehicle lift 11, that is, the dished out portions respectively are substantially shaped as portions of an imaginary cylinder with the axes extending parallel to one another and transversely of the vehicle V and the vehicle lift 11. The wheel dish 13 is located in the path of one of the front wheels W of a vehicle V which is driven over vehicle lift 11 in preparation for the lifting thereof, as shown in FIG. 1, wherein the wheel dish 13 is shown in the path of the left front wheel of the vehicle. Also, the wheel dish 13 is located forwardly of the vehicle lift 11 at such a position that vehicles in a first category, namely, those having a wheel base of a predetermined amount or less, as, for example, 120 inches or less, are more properly positioned relative to superstructure 21 when a front wheel W thereof is resting in dished out portion 31, which position of the vehicle will be designated a first position. Furthermore, the wheel dish 13 is located in such a position that vehicles in a second category having a wheel base greater than said predetermined amount are more properly positioned relative to the superstructure 21 when a front wheel of the vehicle is resting in dished out portion 33, which position of the vehicle will be denoted the second position. It will be understood that the wheel dish 13 is relatively low so that the wheel W can roll over the rearward edge 35 of dished out portion 31 when moving into place in rearward portion 31, and the wheel can roll over the intermediate edge 37 between portions 31, 33 when the wheel is moving from rearward portion 31 to forward portion 33.

The device 15 of the present invention is provided in combination with the heretofore described environment and cooperates therewith in a manner to be described later in the specification. Device 15 comprises a rib or bar 39 fixedly mounted on supporting surface 19, as by fastening means 41 or the like, and projects above the supporting surface. Bar 39 is arranged transversely relative to the vehicle V and the vehicle lift 11. In addition, it is located rearwrdly of vehicle lift 11 and rearwardly of front wheel dish 13 in alignment with the wheel dish and in the path of the front wheel W and rear wheel R of the vehicle V as it is driven into position to be raised by vehicle lift 11.

An important part of the present invention is the amount of spacing of bar 39 rearwardly of wheel dish 13. This spacing is such that when a vehicle in said first category is in said first position, the bar 39 will touch the rear wheel R or be rearwardly of the rear wheel, and such that when a vehicle in said second category is in said first position, the rear wheel of the vehicle is spaced rearwardly of bar 39. In other words, the spacing between the rearward edge 43 of bar 39 and the intermediate edge 37 is substantially equal to said predetermined wheel base amount, as, for example, 120 inches. This is so since intermediate edge 37 and bar 39 are about the same height and will touch corresponding portions respectively on the front and rear wheels, which will be the same distance as the wheel base length. For the sake of clarity, in FIG. 2 the front wheel position of a vehicle, either of said first or second category and in said first position, is shown as at W1. R1 designates the rear wheel position of a vehicle in said first position, in said first category, and having a wheel base length equal to said predetermined length, which is shown by the distance P, and which, for example, is 120 inches. R2 designates the rear wheel position of a vehicle in said second category (as, for example, wheel base P' and greater than P) and in said first position, that is, while its front wheel is still in rearward portion 31. W2 designates the front wheel position of a vehicle in said second category and in said second position, that is, after its front wheel has been moved into forward portion 33.

In using the present invention, the vehicle V is driven into said first position, in which the front wheel W1 is resting in the dished out portion 31, as best shown in FIG. 2. Then, if the rear wheel is touching the bar 39 when the vehicle is in said first position, or before the vehicle gets to said first position, the operator knows that the wheel base is less than said predetermined amount, that is, 120 inches or less in this example. On the other hand, if the rear wheel does not touch bar 39 before the vehicle reaches said first position, that is, before the front wheel W gets into position in the rearward dished out portion 31, then the operator knows that the wheel base is over the predetermined amount (120 inches) and that the vehicle should be moved forwardly until in said second position, that is, until the front wheel W is in said forward dished out portion 33.

From the foregoing description, it can be seen that the present invention provides a very efficient, quick and safe means for spotting vehicles having different wheel base lengths. In addition, it will be understood that the present invention provides a very inexpensive yet highly effective aid for the operators of vehicle lifts in the spotting of vehicles.

Although the invention has been described and illustrated with respect to a preferred embodiment thereof, it is to be understood that it is not to be so limited since changes and modifications may be made therein which are within the full intended scope of this invention as hereinafter claimed.

I claim:

1. In combination, a vehicle lift for vertically lifting vehicles having wheel bases of different amounts, means associated with the front wheel of vehicles to be lifted for positioning the vehicles properly relative to said vehicle lift with the vehicles in a first category having a wheel base of a predetermined amount or less being properly positioned when in a first position and with the vehicles in a second category having a wheel base greater than said predetermined amount being properly positioned when in a second position, and indicating means associated with the rear wheel of vehicles to be lifted and located in spaced relationship to said means associated with the front wheel of vehicles to be lifted for indicating in which category vehicles are when in said first position whereby if a particular vehicle is in said first category it can be left in said first position and if in said second category it can be moved to said second position for proper lifting.

2. In combination, supporting surface, a vehicle lift including a vertically disposed jack extending upwardly through said supporting surface and superstructure means mounted on the upper end of said jack for lifting a vehicle above said supporting surface, first means associated with the front wheel of vehicles to be lifted for positioning the vehicles properly relative to said superstructure means with the vehicles in a first category having a wheel base of a predetermined amount or less being properly positioned when in a first position and with the vehicles in a second category having a wheel base greater than said predetermined amount being properly positioned when in a second position, and indicating means carried by said supporting surface in spaced relationship rearwardly of said first means for indicating by the relationship therewith of the rear wheel of vehicles to be lifted in which of said categories vehicles are when in said first position whereby if a particular vehicle is in said first category it can be left in said first position and if in said second category it can be moved to said second position for proper lifting.

3. In combination, a supporting surface, a vehicle lift including a vertically disposed jack extending upwardly through said supporting surface and superstructure means mounted on the upper end of said jack for lifting a vehicle above said supporting surface, a front wheel dish mounted on said supporting surface forwardly of said vehicle lift, said wheel dish including a rearward dished out portion adapted to receive a front wheel of a vehicle when driven over said superstructure means and stopped in a first position relative to said superstructure means and including a forward dished out portion forwardly of said rearward dished out portion adapted to receive a front wheel of a vehicle when the vehicle is moved forwardly from said first position to a second position relative to said superstructure means, said wheel dish being located in such a position that vehicles in a first category having a wheel base of a predetermined amount or less are properly positioned relative to said superstructure means when in said first position and vehicles in a second category having a wheel base greater than said predetermined amount are properly positioned relative to said superstructure means when in said second position, and indicating means associated with the rear wheel of vehicles to be lifted and located in spaced relationship rearwardly of said front wheel dish for indicating in which category vehicles are when in said first position whereby if a particular vehicle is in said first category it can be left in said first position and if in said second category it can be moved to said second position for proper lifting.

4. In combination, a supporting surface, a vehicle lift including a vertically disposed jack extending upwardly through said supporting surface and superstructure means mounted on the upper end of said jack for lifting a vehicle above said supporting surface, a front wheel dish mounted on said supporting surface forwardly of said vehicle lift, said wheel dish including a rearward dished out portion adapted to receive a front wheel of a vehicle when driven over said superstructure means and stopped in a first position relative to said superstructure means and including a forward dished out portion forwardly of said rearward dished out portion adapted to receive a front wheel of a vehicle when the vehicle is moved forwardly from said first position to a second position relative to said superstructure means, said wheel dish being located in such a position that vehicles in a first category having a wheel base of a predetermined amount or less are properly positioned relative to said superstructure means when in said first position and vehicles in a second category having a wheel base greater than said predetermined amount are properly positioned relative to said superstructure means when in said second position, and a rib mounted on said supporting surface rearwardly of said vehicle lift in spaced relationship to said wheel dish and in alignment therewith along the path of travel of a front wheel of a vehicle being driven over said superstructure means and adjacent a rear wheel of the vehicle when the vehicle is in said first or second positions, the spacing between said rib and said wheel dish being such that when a vehicle in said first category is in said first position a rear wheel of the vehicle touches said rib and when a vehicle in said second category is in said first position a rear wheel of the vehicle is spaced rearwardly of said rib to give an indication that the vehicle is in said second category and should be moved forward to said second position.

5. In combination, a supporting surface, a vehicle lift including a vertically disposed jack extending upwardly through said supporting surface and superstructure means mounted on the upper end of said jack for lifting a vehicle above said supporting surface, a front wheel dish mounted on said supporting surface forwardly of said vehicle lift; said wheel dish comprising a rearward dished out portion adapted to receive a front wheel of a vehicle when driven over said superstructure means and stopped in a first position relative to said superstructure means, a forward dished out portion forwardly of said rearward dished out portion adapted to receive a front wheel of a vehicle when the vehicle is moved forwardly from said first position to a second position relative to said superstructure means, and an intermediate edge between said rearward dished out portion and said forward dished out portion; said wheel dish being located in such a position that vehicles in a first category having a wheel base of a predetermined amount or less are preporly positioned relative to said superstructure means when in said first position and vehicles in a second category having a wheel base greater than said predetermined amount are properly positioned relative to said superstructure means when in said second position, and a narrow rib fixedly mounted on said supporting surface rearwardly of said vehicle lift in spaced relationship to said wheel dish and in alignment therewith along the path of travel of a front wheel of a vehicle being driven over said superstructure means and adjacent a rear wheel of the vehicle when the vehicle is in said first or second positions, said rib and said intermediate edge being substantially parallel and extending substantially transverse relative to said vehicle lift and to a vehicle being lifted thereby, said rib and said intermediate edge projecting above said supporting surface for substantially the same distance and being spaced apart a distance equal to said wheel base of said predetermined amount whereby when a vehicle in said first category is in said first position a rear wheel of the vehicle touches said rib or is forwardly thereof and when a vehicle in said second category is in said first position a rear wheel of the vehicle is spaced rearwardly of said rib to give an indication that the vehicle is in said second category and should be moved forward to said second position.

References Cited by the Examiner

UNITED STATES PATENTS

| | | | |
|---|---|---|---|
| 2,503,428 | 4/1950 | Weaver | 187—8.59 |
| 2,777,538 | 1/1957 | Cochin | 187—8.75 |
| 3,111,196 | 11/1963 | Plassman | 187—8.41 |

EVON C. BLUNK, *Primary Examiner.*

A. H. NIELSEN, *Assistant Examiner.*